(12) United States Patent
DeFilippis

(10) Patent No.: US 7,702,060 B2
(45) Date of Patent: Apr. 20, 2010

(54) EXPANDED NUCLEAR FUEL CHANNEL

(75) Inventor: Michael Scott DeFilippis, Wilmington, NC (US)

(73) Assignee: Global Nuclear Fuel - Americas, L.L.C., Wilmington, NC (US)

( * ) Notice: Subject to any disclaimer, the term of this patent is extended or adjusted under 35 U.S.C. 154(b) by 138 days.

(21) Appl. No.: 11/583,789

(22) Filed: Oct. 20, 2006

(65) Prior Publication Data

US 2008/0095296 A1   Apr. 24, 2008

(51) Int. Cl.
    *G21C 3/00* (2006.01)
(52) U.S. Cl. .................. 376/409; 376/434; 376/453; 376/457
(58) Field of Classification Search .................. 376/412, 376/434, 438, 453, 457, 443, 409
    See application file for complete search history.

(56) References Cited

U.S. PATENT DOCUMENTS

| | | | |
|---|---|---|---|
| 4,507,840 A | 4/1985 | Steinert et al. | |
| 4,604,785 A | 8/1986 | Eddens | |
| 4,764,340 A * | 8/1988 | Lui et al. | 376/434 |
| 4,767,595 A | 8/1988 | Wolters, Jr. et al. | |
| 4,889,684 A | 12/1989 | Johansson | |
| 4,913,875 A | 4/1990 | Johansson et al. | |
| 4,938,920 A * | 7/1990 | Garzarolli et al. | 376/457 |
| 4,970,047 A | 11/1990 | Ueda et al. | |
| 4,999,153 A | 3/1991 | Johansson et al. | |
| 5,078,961 A | 1/1992 | Johansson et al. | |
| 5,091,146 A | 2/1992 | Dix | |
| 5,186,890 A * | 2/1993 | Ohashi et al. | 376/434 |
| RE34,246 E * | 5/1993 | Crowther et al. | 376/443 |
| 5,253,278 A * | 10/1993 | Kanazawa et al. | 376/434 |
| 5,265,139 A * | 11/1993 | Yanagi et al. | 376/435 |
| 5,297,177 A * | 3/1994 | Inagaki et al. | 376/462 |
| 5,299,244 A * | 3/1994 | Yamauchi et al. | 376/438 |
| 5,361,282 A | 11/1994 | Adamson et al. | |
| 5,436,946 A | 7/1995 | Curulla et al. | |
| 5,787,140 A | 7/1998 | Dunlap et al. | |
| 5,809,101 A | 9/1998 | Dunlap et al. | |
| 6,516,043 B1 * | 2/2003 | Chaki et al. | 376/438 |
| 6,735,267 B2 * | 5/2004 | Orii et al. | 376/435 |
| 6,885,722 B2 * | 4/2005 | Masumi | 376/435 |

FOREIGN PATENT DOCUMENTS

| | | |
|---|---|---|
| DE | 1 816 561 | 8/1969 |
| EP | 0 820 066 | 1/1998 |
| JP | 59-180389 | 10/1984 |
| JP | A-1-098994 | * 4/1989 |

* cited by examiner

*Primary Examiner*—Rick Palabrica
(74) *Attorney, Agent, or Firm*—Nixon & Vanderhye P.C.

(57) ABSTRACT

A fuel channel for housing a fuel rod bundle in a boiling water nuclear reactor includes an expanded section to create an increased flow area at a top of the fuel channel and thereby reduce a pressure drop through the fuel channel. The expanded section eliminates a need for channel spacers and a fastener guard.

6 Claims, 4 Drawing Sheets

EXPANDED NUCLEAR FUEL CHANNEL

BACKGROUND OF THE INVENTION

The present invention relates to a fuel channel for a boiling water nuclear reactor and, more particularly, to an expanded fuel channel that reduces the number of individual components and creates an increased flow area at the top of the channel.

A conventional fuel bundle assembly in a boiling water nuclear reactor includes a lower tie plate, an upper tie plate and a matrix of sealed fuel rods supported between the upper and lower tie plates. The fuel rods contain nuclear fuel pellets in sealed containment for supporting a required critical reaction for the generation of steam. One or more coolant rods is included in the matrix of the fuel rods and is also supported between the upper and lower tie plates. A fuel channel surrounds the tie plates, fuel rods and one or more coolant rods. This channel is generally square in cross-section and made of metal (preferably Zircaloy). During reactor operation, coolant water enters through the lower tie plate within the fuel channel and flows upwardly between the upstanding fuel rods. Water and generated steam exit through the upper tie plate. The channel confines the required moderator coolant flow to a flow path and is restricted between the tie plates.

A typical boiling water reactor channel has a constant internal flow area formed by a full length square cross-section with rounded corners (see FIG. 1). Variations of the uniform thickness concept are disclosed in commonly-owned U.S. Pat. No. 4,749,543. The patent discloses channel designs that have reduced average thickness in the upper portion of the channels corresponding to a lower pressure difference acting on the channel sides in the upper portion of the channel. In some instances, the axial variation of the channel average thickness increases water volume adjacent the upper part of the channel to provide increased neutron moderation, to minimize the steam void reactivity coefficient, and to provide a greater cold shut-down margin.

Typically, a fuel channel is a constant cross-section with channel spacers and a channel fastener added to properly position the channeled fuel in the upper guide plate of the reactor. It would be desirable to eliminate the need for separate channel spacers and a fastener guard and additionally to create additional flow area to reduce the pressure drop relative to current designs.

BRIEF DESCRIPTION OF THE INVENTION

In an exemplary embodiment of the invention, a fuel channel for housing a fuel rod bundle in a boiling water nuclear reactor includes an expanded section to create an increased flow area at a top of the fuel channel and thereby reduce a pressure drop through the fuel channel. The expanded section may eliminate a need for channel spacers and a fastener guard.

In another exemplary embodiment of the invention, a fuel channel includes a bottom section having a first four-sided perimeter sized to house a tie plate; and an expanded section cooperable with the bottom section and having a second four-sided perimeter, wherein a length of at least one side of the second perimeter is greater than a length of a corresponding at least one side of the first perimeter.

DETAILED DESCRIPTION OF THE INVENTION

Figure 2:
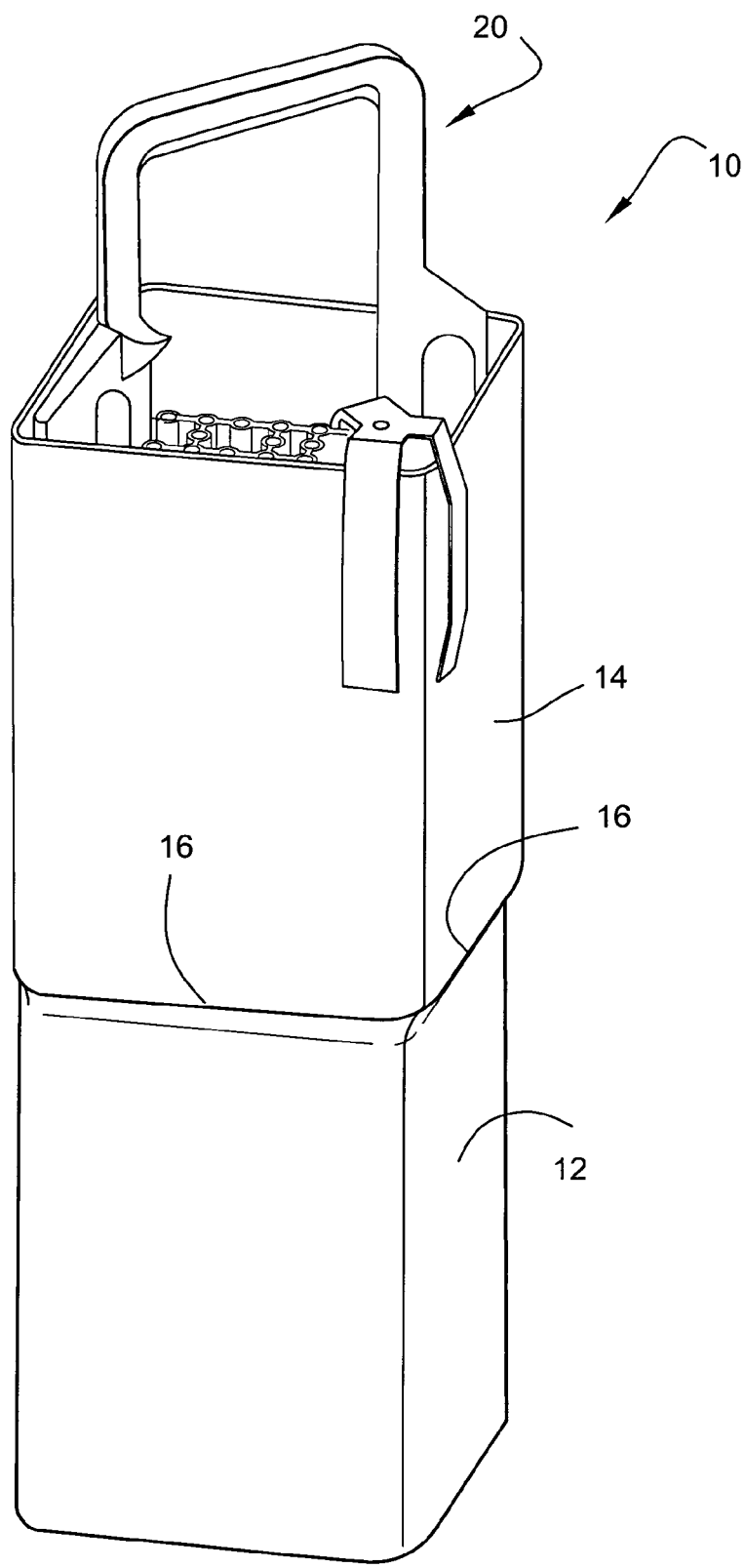
FIG. 2 is a perspective view of the expanded fuel channel design described herein.
Figure 3:
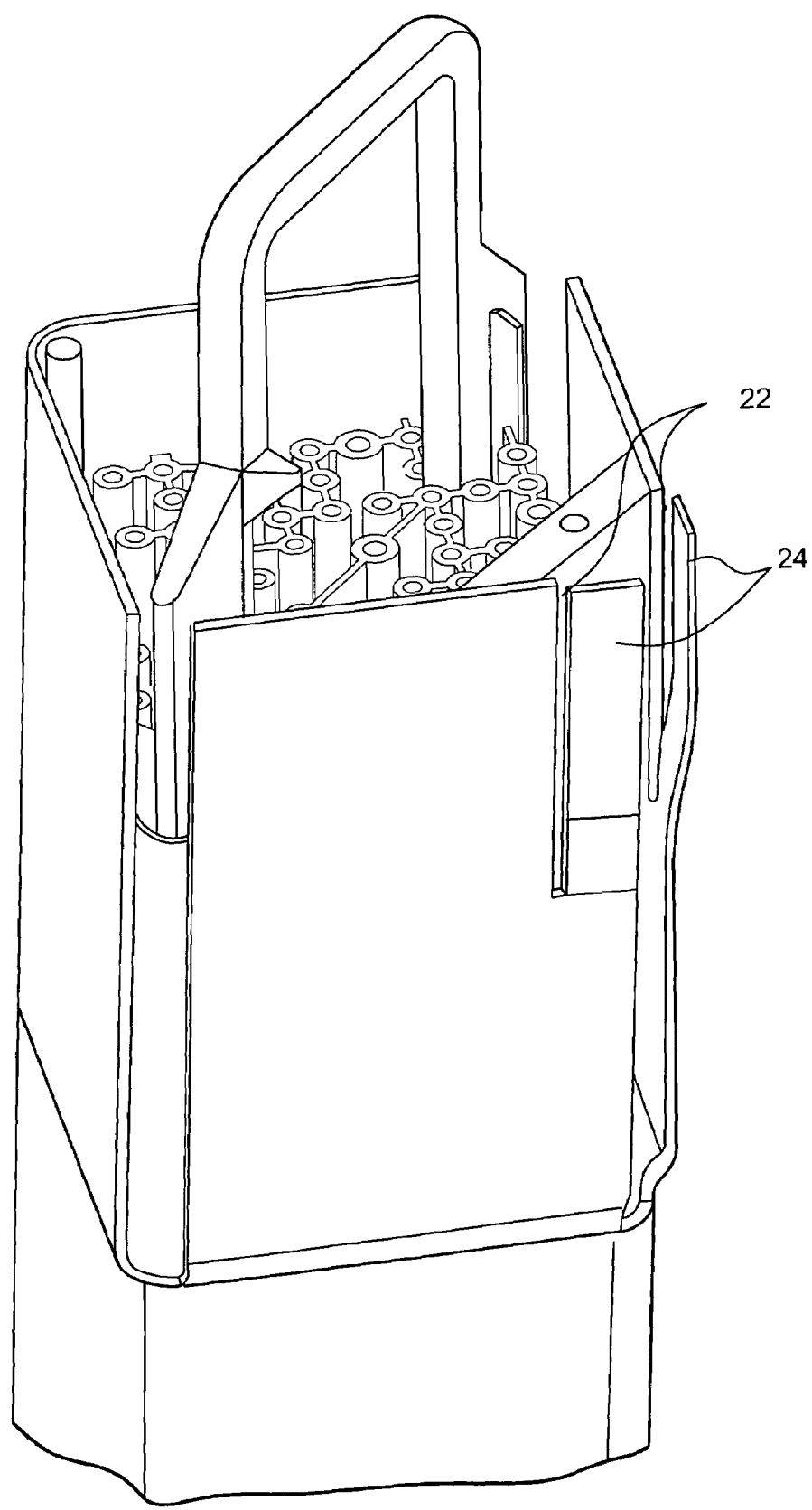
FIG. 3 is an alternative embodiment of the expanded channel with integrated channel fastener springs.

With reference to FIG. 2, a fuel channel 10 typically houses a fuel bundle assembly for boiling water nuclear reactor. The fuel bundle assembly includes a plurality of fuel rods, a pair of coolant rods, and the channel 10 surrounding the fuel rods and coolant rods. In some designs, a conventional upper tie plate is eliminated in favor of a handle or lifting bar assembly 20 as shown. The handle assembly 20 facilitates insertion and removal of the fuel bundle.

Figure 1:
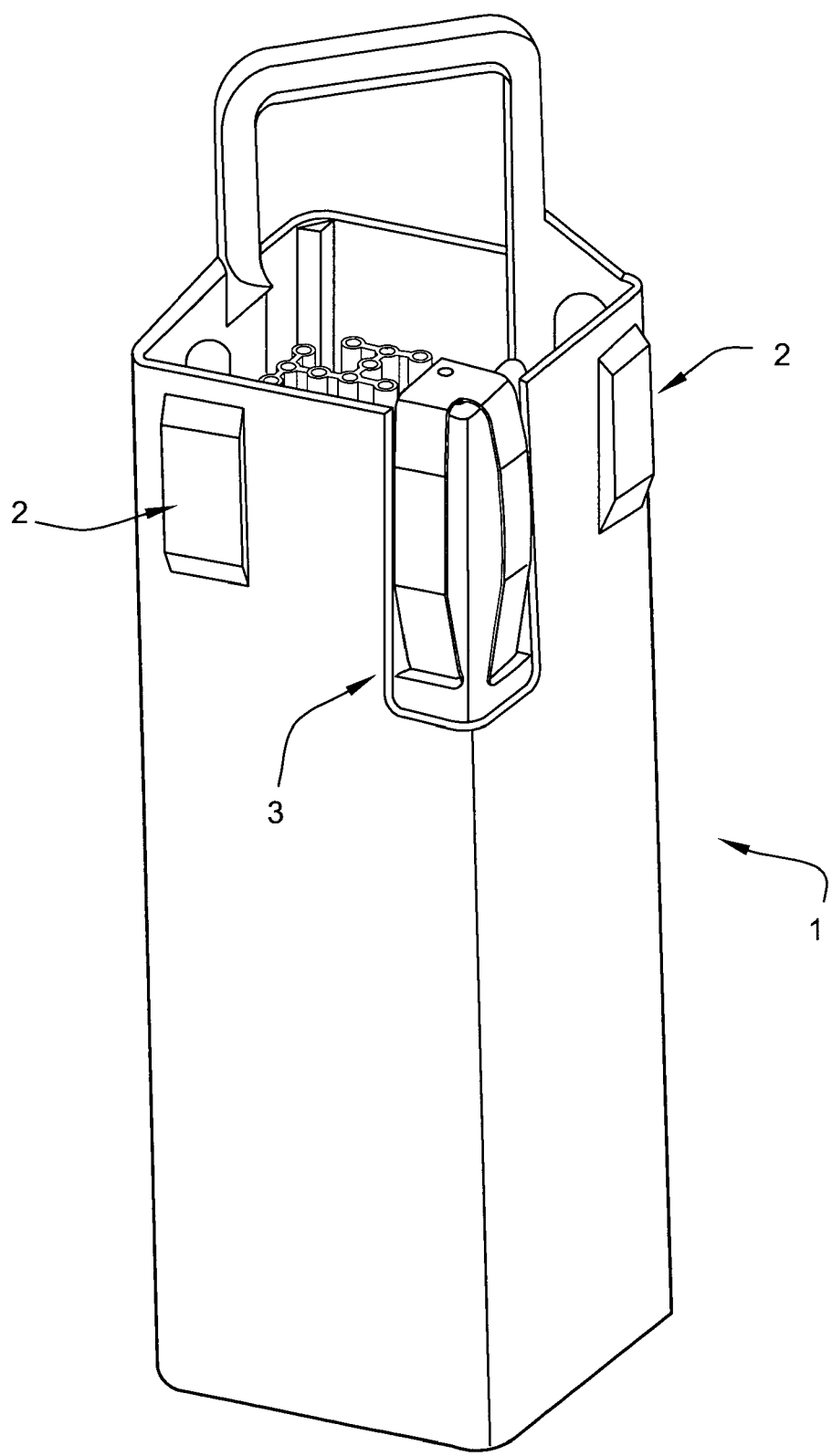
FIG. 1 is a perspective view of a conventional fuel channel.

As shown in FIG. 1, a conventional fuel channel 1 typically includes a constant cross-section with channel spacers 2 and a channel fastener 3 for positioning the fuel bundle in the upper guide plate of the reactor. In an effort to reduce the number of individual components associated with the fuel channel and to create an increased flow area at the top of the fuel channel, the fuel channel 10 described herein expands at least two sides of the channel outward to approximately the width of the existing channel spacers and fastener guard. That is, the fuel channel 10 includes a bottom section 12 having a first four-sided perimeter sized to house a tie plate. An expanded section 14 is cooperable with the bottom section 12 and has a second four-sided perimeter, wherein lengths of at least two sides of the second perimeter are greater than lengths of a corresponding at least two sides of the first perimeter. See, for example, expanded sides 16 in FIG. 2.

The expanded section 14 preferably begins at an elevation above the top of the active fuel. By having the expanded section 14 below the grid of the upper tie plate, additional flow area is created, thereby reducing the pressure drop relative to current designs. Additionally, the expanded section 14 eliminates the need for separate spacers and the fastener guard.

Figure 4:
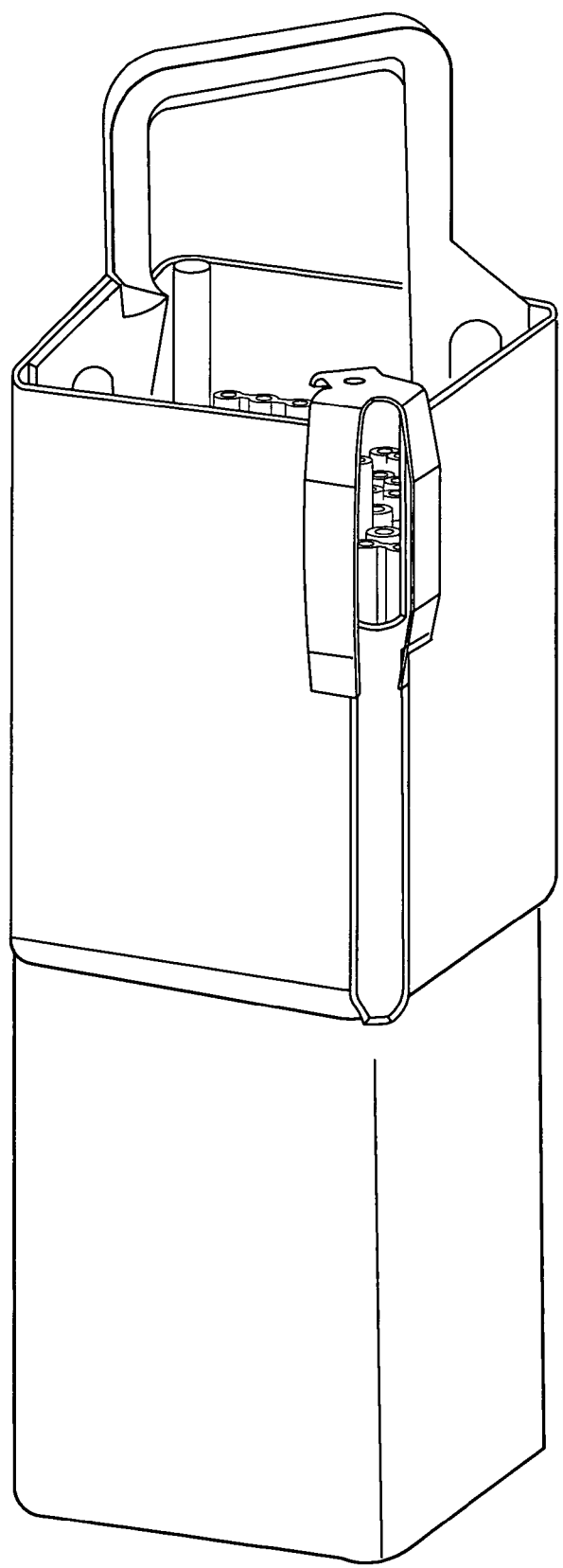
FIG. 4 is another alternative expanded fuel channel design.

The expansion of the channel 10 on only two sides enables the design to be compatible with existing power plants. In an alternate embodiment shown in FIG. 4, the channel is expanded on all four sides. This design is suited for future plant designs. Expansion of the channel 10 on all sides provides additional pressure drop performance improvements over the first embodiment.

The exact shape and location of the transition to the expanded section 14 can be determined through analysis and testing during product development. The transition could be a sharp step change, simple radius or very gradual angular change. The location of the elevation change could be at any point above where the control blades are positioned at maximum insertion. Alternatively, a small expansion may be formed down in the control blade zone with a larger one above the control blade or in the case of expanding on three or four sides, the non-control blade sides may expand below the control blade height.

In yet another alternative embodiment, the expanded section 14 may include a plurality of slots 22 therein defining one or more finger springs 24. The finger springs 24 serve the same purpose as the channel fastener springs in the conventional design. Additional or alternative slots may also be provided at the corners to make forming easier and to further reduce the pressure drop by creating more exit area for the bundle flow.

As a peripheral advantage, the expanded channel described herein may also enable a previously-proposed design for a top cover filter to be implemented. The top cover filter proposal was essentially a porous plate that would prevent debris from entering the fuel bundle from the top. A concern with the top filter, however, was the additional pressure drop. The expanded channel design described herein may create enough pressure drop margin to enable use of the top filter.

The expanded fuel channel described herein eliminates several components and the associated manufacturing, inspection and purchasing requirements associated with those components, thereby resulting in a cost savings. Moreover, the expanded channel reduces a pressure drop across the fuel bundle, increasing flow and bundle performance.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A fuel channel for housing a fuel rod bundle in a boiling water nuclear reactor, the fuel channel comprising:
    a bottom section having a first external four-sided perimeter, the bottom section extending uniformly to a bottom of the fuel channel; and
    an expanded section cooperable with the bottom section and having a second external four-sided perimeter, the expanded section extending uniformly from atop the bottom section to a top of the fuel channel, wherein a linear length of only two sides of the second perimeter is greater than a linear length of a corresponding two sides of the first perimeter, and wherein an internal area of a cross-section of the expanded section is greater than an internal area of a cross-section of the bottom section.

2. A fuel channel according to claim 1, wherein a transition between the bottom section and the expanded section is one of a step change, a simple radius, or a gradual angular change.

3. A fuel channel according to claim 1, wherein the fuel channel is without channel spacers or a fastener guard.

4. A fuel channel according to claim 1, wherein the expanded section comprises a top section of the fuel channel extending from below an upper tie plate matrix, thereby creating additional flow area and reducing a pressure drop.

5. A fuel channel according to claim 1, wherein the expanded section comprises a top section of the fuel channel, and wherein the expanded section includes a plurality of slots therein.

6. A fuel channel according to claim 5, wherein the slots define at least one finger spring.

\* \* \* \* \*